United States Patent [19]
Plaskon

[11] 3,878,317
[45] Apr. 15, 1975

[54] CABLE SPLICE ASSEMBLY
[75] Inventor: Edward S. Plaskon, Clifton, N.J.
[73] Assignee: Walter A. Plummer, Sherman Oaks, Calif.
[22] Filed: Apr. 2, 1973
[21] Appl. No.: 346,923

[52] U.S. Cl. .................. 174/92; 29/628; 174/76
[51] Int. Cl. .............................................. H02g 15/08
[58] Field of Search .......................... 174/91–93, 174/88 R, 77 R, 76, 87, DIG. 11, DIG. 8, 138 F; 29/628

[56] References Cited
UNITED STATES PATENTS
| | | | |
|---|---|---|---|
| 1,241,809 | 10/1917 | Beardsley et al. | 174/88 R X |
| 2,452,823 | 11/1948 | Wright | 174/88 R |
| 2,930,835 | 3/1960 | Bollmeier | 174/76 |
| 2,967,795 | 1/1961 | Bollmeier et al. | 174/76 X |
| 3,187,088 | 6/1965 | Warner | 174/DIG. 8 UX |
| 3,187,090 | 6/1965 | Edwards | 174/138 F |

*Primary Examiner*—Darrell L. Clay
*Attorney, Agent, or Firm*—Spensley, Horn & Lubitz

[57] ABSTRACT

A splice assembly, particularly suitable for applications where the splice is subjected to physical abuse, which includes an inner and outer jacket is disclosed. A liquid which hardens once in the assembly is injected into the assembly through a valve in the outer jacket. This liquid also penetrates the inner jacket, which is placed about a conductor, through a plurality of apertures disposed through the inner jacket.

9 Claims, 8 Drawing Figures

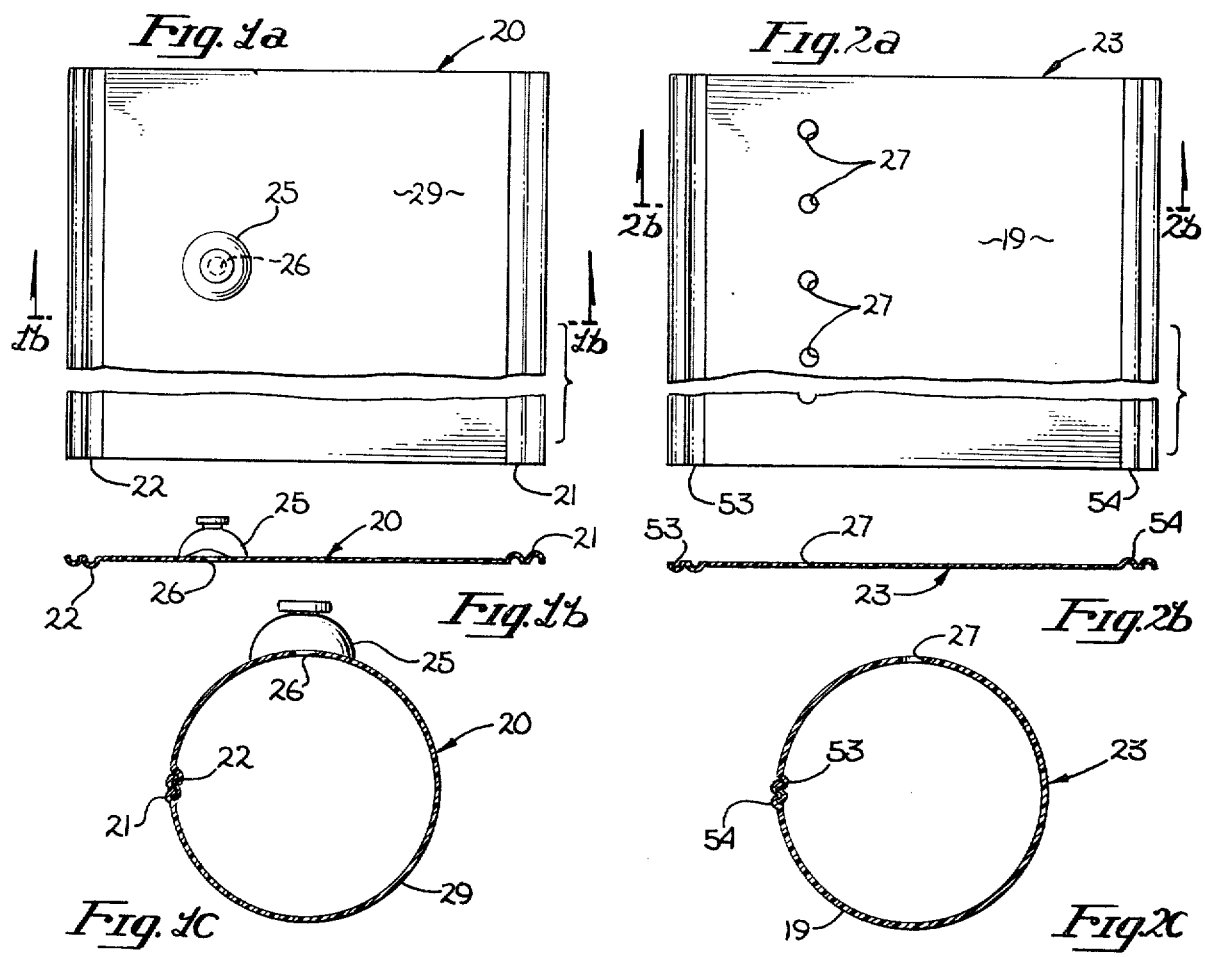
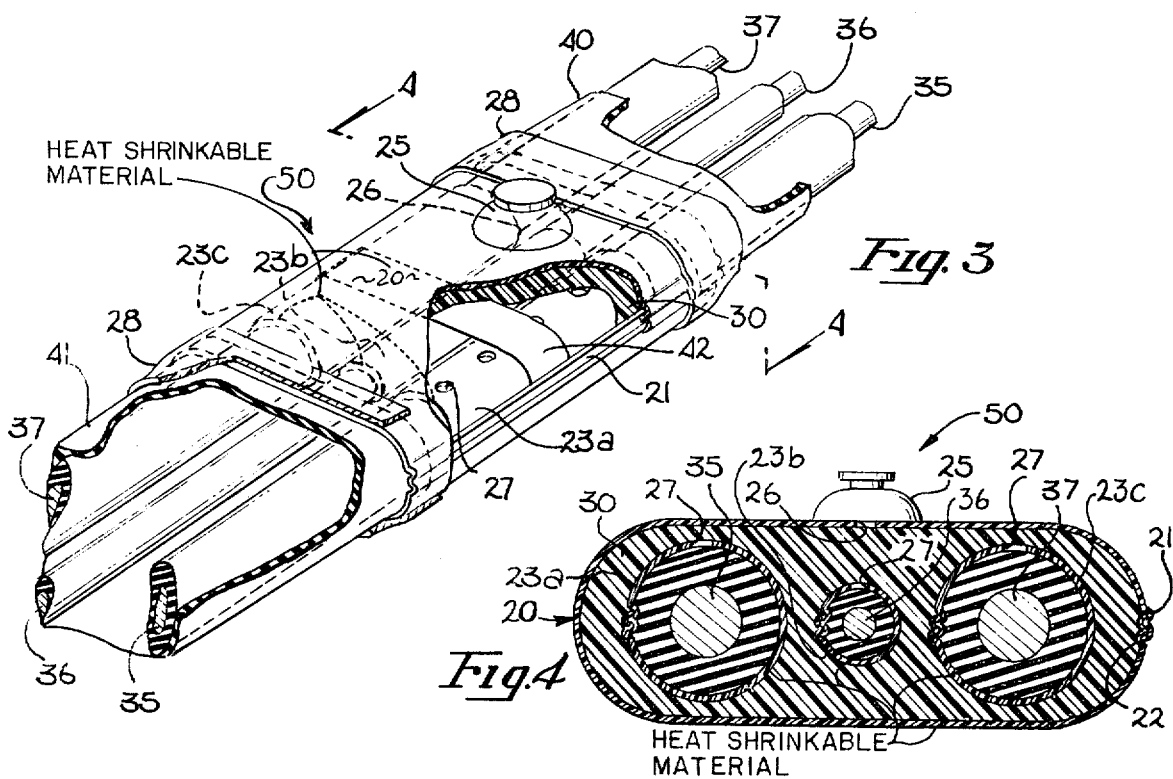

CABLE SPLICE ASSEMBLY

BACKGROUND OF THE INVENTION

1. Field of the Invention

The invention relates to cable splices such as those utilized in, mining, communications and other applications.

2. Prior Art

While the present invention is not limited to use in the mining or communication field, it is particularly suitable for cables which are subjected to physical abuse or to rain, abrasion or corrosive gases; this environment is often found in the mining field. Prior art splices which are subjected to this environment, in order to remain in tact, require costly procedures, carefully executed by highly trained personnel. As will be seen, the present invention provides a splice assembly which has numerous advantages over the prior art and which can be utilized without the highly skilled personnel required with many prior art splice assemblies.

SUMMARY OF THE INVENTION

The cable splice assembly of the present invention includes an outer jacket and in the presently preferred embodiment, an inner jacket, both comprising flexible material having longitudinally interlocking fastener tracks. A valve is coupled to the outer jacket and provides a port through which liquid may be injected under pressure into the cable splice assembly. The inner jacket which is disposed about the splice includes a plurality of apertures to allow the liquid to freely flow through the inner jacket and to encase the conductors. The liquid, once injected into the jacket, hardens and provides protection for the splice.

It is an object of this invention to provide a splice assembly for insulating electrical conductors from the elements, including abrasives, water, particulate matter, gaseous contaminents, heat and fire. In the present invention this is accomplished by injecting a liquid which hardens into the splice assembly which includes an inner jacket, an outer jacket to form a single splice assembly.

Another object of the present invention is to provide a means for repairing damaged lines without employing highly trained personnel and without requiring special equipment, and to this end, the present invention provides a splice assembly that can be utilized with a person having only minimal skill in the electrical field.

Still another object of the present invention is to provide a reasonably flexible permanent or temporary splice.

BRIEF DESCRIPTION OF THE DRAWINGS

FIG. 1a is a plan view of the outer jacket.

FIG. 1b is a sectional view of the outer jacket of FIG. 1a taken through section line 1b—1b of FIG. 1a.

FIG. 1c is a sectional view of the outer jacket of FIGS. 1a and 1b shown with the interlocking fastener tracks joined.

FIG. 2a is an enlarged plan view of the inner jacket.

FIG. 2b is a sectional view of the inner jacket taken through section line 2b—2b of FIG. 2a.

FIG. 2c is a sectional view of the inner jacket of FIGS. 2a and 2b shown with the interlocking fastener tracks joined.

FIG. 3 is a perspective view of the splice assembly and includes cutaway sections.

FIG. 4 is a cross sectional view of the splice assembly of FIG. 3 taken along section line 4—4 of FIG. 3.

DETAILED DESCRIPTION OF THE INVENTION

While the present invention may be utilized in countless applications, the presently preferred embodiment will be discussed in conjunction with mine cables since this environment is a particularly difficult one. As will be readily apparent to one skilled in the art, the invention may be utilized in other applications such as in communications.

Referring particularly to FIG. 3, the presently preferred embodiment of the cable splice assembly 50 is shown between two typical electrical mine cables 40 and 41. The assembly 50 is used to join two cables, cable 40 and cable 41. Each cable includes a plurality of conductors such as conductors 35, 36 and 37. An outer jacket 20 has been cut away to expose a portion of inner jackets 23a, 23b and 23c. The splice assembly 50 generally includes the outer sleeve jacket 20, one or more inner sleeve jackets (such as 23a), and a valve 25, which is coupled to the outer jacket 20, for injecting a liquid into the splice assembly 50, and a sealing means such as tape 28 for sealing the outer jacket 20.

In the presently preferred embodiment, the inner jacket 23 shown most clearly in FIGS. 2a, 2b and 2c, is fabricated from polyvinyl chloride plastic sheet 19. Other suitable materials may be used such as polyurethane or polyolefin. The material comprising the outer jacket may be a heat reactive plastic which shrinks when heated. This is used since the temperature of the liquid injected into the jacket rises as the liquid cures, thereby causing the outer jacket to more tightly grip the cables. Interlocking fastener tracks 53 and 54 are disposed along opposite parallel edges of the sheet 19. These tracks are fastened to the sheet 19 by heat fusion or other known means or may be extruded as part of the sheet 19. In the presently preferred embodiment, interlocking tracks such as those shown in U.S. Pat. No. 2,960,561, are used. Other known means for sealing the edges of sheet 19 to form the jacket may be utilized. A row of apertures 27 are disposed through the sheet 19 to allow a liquid having a low viscosity to flow into the jacket once the sheet 19 is formed into the jacket. The apertures 27 are disposed in a row parallel to the tracks and at a distance from one track equal to approximately one-quarter of the width of the sheet 19. Thus, when the sheet is formed into the jacket 23, by joining the tracks, the row of apertures 27 are approximately 90° from the seam defined by the tracks 53 and 54. The material from which the inner jackets are fabricated may be clear (transparent or translucent) in order that the filling of the jacket with liquid may be observed or the jackets may be color coded or that different conductors in the splice assembly may be identified.

Typically, the inner jackets which are dielectric encase individual wire conductors such as conductors 35, 36 and 37, and thus the width of sheet 19 is slightly larger than the perimeter of the conductor that it surrounds. The inner jackets 23a, 23b and 23c extend longitudinally along the conductors 35, 36 and 37 a short distance beyond the actual wire splice and terminate within the outer jacket 20. The jackets 23 assume the shape of the conductor (generally cylindrical). In the presently preferred embodiment approximately a one-quarter inch "play" exists between the inner surface of the inner jacket and the outer surface of the conductor. This provides a space which may be filled with liquid 30. Soft foam strips or other resilient members may be placed between the inner jacket and cables, at the ends of the inner jackets, to prevent the inner jackets from rotating on the cables.

The outer jacket 20, best shown in FIG. 1a through FIG. 1c and FIG. 4, is in the presently preferred embodiment fabricated from a heavy gauge polyvinyl chloride plastic sheet 29 which may be similar to sheet 19. As in the case of the inner jacket, other suitable materials such as polyurethane or polyolefin may be used. The outer jacket 20 may be tapered in the region near its ends so as to help prevent the splice assembly from engaging objects when the cable is being dragged along the ground.

A single aperture 26 is disposed through sheet 29 at a distance from one track equal to approximately one-quarter of the width of the sheet 29. As was the case with the inner jacket, once the outer jacket is formed, the aperture 26 is approximately 90° from the seam. A valve 25 is fastened to the outer jacket 20 and communicates with the aperture 26. Valve 25, which may be a check valve, allows a liquid (having a low viscosity) to be injected into the outer jacket 20 but prevents the liquid 30 from escaping back through the valve 25.

Both the inner and outer jacket may be fabricated from tubing of sheet material which shrinks when heated. This type of material, which is commercially available, will assure a particularly tight assembly.

Typically, the inner diameter of the outer jacket 20 is approximately equal or slightly larger than the cables being spliced. Thus, the width of sheet 29 may be approximately equal to or slightly larger than the circumferences of the cables being spliced. The length of the outer jacket should be sufficient to extend beyond the ends of the inner jacket or jackets. This length may be cut in the field along with the lengths of the inner jackets. The outer jacket 20 may be cylindrically shaped (FIG. 1c), although it will conform to the shape of any cable being spliced, as best shown in FIG. 4. In an alternate embodiment the outer jacket may be larger in circumference than the cables being spliced. However, when this occurs the ends of the outer jacket are tapered to the circumference approximately equal to that of the cables being spliced.

In a typical cable splice assume two cables 40 and 41 having multiple conductors 35, 36 and 37, are required to be connected. Initially, the conductors 35, 36 and 37 are coupled using available methods, well known in the art. This connection (which is not illustrated) may be made with commercially available crimped connectors or other connectors. Note this connection is generally situated under tape 42 within the inner jackets 23a, 23b and 23c. After the connections of conductors 35, 36 and 37 have been made, lengths of inner jackets 23 are cut to the length required and placed around each of the individual conductors as best shown in FIGS. 3 and 4. These inner jackets are locked in place by engaging the interlocking fastener tracks 53 and 54. The apertures 27 in the adjacent inner jackets 23 are positioned so that they point away from the adjoining conductor since this improves the insulating efficiency of the assembly, that is, arcing is less likely to occur if the apertures are not disposed between the conductors. Following this, a relatively loose wrapping of tape 42 may be placed about the conductors to prevent spreading of the conductors at a later time. Note that the inner jackets act as spacers and assure that the conductors will remain spaced apart in the assembly.

In order to obtain good contact between the existing cables 40 and 41 and the outer jacket 20 the cables are wirebrushed and/or cleaned with cable cleaners as is often done in the art. The outer jacket 20 is then wrapped about the cables 40 and 41 and the inner jackets 23a, 23b and 23c, as shown in FIG. 3, and the interlocking tracks 21 and 22 of the outer jacket 20 are then engaged. It is important that the interlocking fastener tracks of the outer jacket be located approximately 90° from vertical when placed about the cables so that during the filling step entrapped gases escape, ensuring a complete filling and thereby providing an acceptable dielectric insulation between the conductors and groundwires. By having the seam 90° from the valve 25 as shown in FIG. 4, for flat type cable, the stress caused at the seam when the assembly is filled with liquid is reduced.

A heavy duty electrical tape 28, as shown in FIG. 3, is then used to secure the splice assembly 50 in place on the cables 40 and 41 when the liquid 30 is injected into the volume defined by the outer jacket. Note the tape 28 forms a seal between the outer surface of the cable and the outer jacket 20. Extra turns of tape 28 should be applied at the joint between the outer jacket 20 and the cable 40 or 41. The tape 28 may later be removed if desired after the liquid has been injected into the outer jacket and has hardened.

Liquid 30 is then injected, preferably under pressure, by such means as a hand gun, into the splice assembly 50 through the valve 25. The liquid 30, after passing through the valve 25, permeates the entire volume of the outer jacket 20 and flows through the apertures 27 into the inner jacket 23 completely surrounding each conductor 35, 36 and 37, as is best shown in FIG. 4. As the liquid 30 hardens and permeates the volume of the splice assembly 50, a slight bleeding may occur at the ends of the outer jacket 20 at the tape 28. This is helpful since it also enables air and other gasses to be vented from the assembly. The venting of air and gas is necessary in order to allow the liquid 30 to completely fill the assembly. In addition, perforations may be added to the outer jacket to enhance the venting of air and gas. The liquid 30 in the presently preferred embodiment is a fire-resistant, dielectric compound that changes chemical properties from a fluid to a hardened compound in a matter of minutes. Such liquids are commercially available and well known in the art. This liquid, once hardened, not only insulates but also isolates and serves to electrically and mechanically protect conductors 35, 36 and 37 from the environment. If the outer jacket is fabricated from a clear material, a visual indication of the filling of the assembly may be obtained.

After the liquid 30 has hardened, the assembly 50 is completed, although the appearance and profile of the assembly may be improved by using a knife to cut-off valve 25. The tape 28, as mentioned, may also be removed if desired, but if left on assists in reducing the impedence of the assembly when it is being dragged.

The finished splice assembly 50 serves as a durable, permanent splice assembly for general applications. However, it may just as well serve as a temporary splice. Temporary splices are made using the same procedure and materials that are used in the above description and may be readily removed from the cable.

The inner and outer jackets may be reusable, particularly if the jackets have been fabricated from a non-sticking material or if a releasing agent is applied to the inner surface of the outer jacket and to the inner and outer surfaces of the inner jacket before use.

While in the presently preferred embodiment the jackets 23a, 23b and 23c have been formed from sheets using interlocking fastening tracks, they alternatively may be damaged) extruded tubes or a wrapping of sheet material. The disclosed splice assembly may also be used to repair damaged cables (for example, where the outer cover on a cable has been damages) without necessarily being used with a splice.

Thus, there has been described a simple, easy-to-install splice assembly, particularly adaptable for use on splicing cables subjected to harsh environments. The splice assembly when completed, in addition to having a neat appearance, does not have any sharp edges and has a low profile permitting the cable to be more readily dragged without damaging the splice.

What is claimed is:

1. An electrical cable splice assembly for protecting each spliced conductor in a cable comprised of one or more conductors, comprising:
   a. an inner cover circumferentially surrounding each said spliced conductor each of said inner covers being comprised of a generally cylindrical flexible plastic member having a first pair of interlocking tracks fixably secured to corresponding edges along the length thereof and interlocked with each other securing said inner cover about each said conductor, each of said inner covers having apertures disposed therethrough to allow a liquid to pass from the exterior to the interior thereof;
   b. an outer jacket circumferentially surrounding said conductors and each said inner cover, said outer jacket being comprised of a generally cylindrical flexible plastic member having a second pair of interlocking tracks fixably secured to corresponding edges along the length thereof, said second pair of tracks securing said outer jacket around said conductors and each of said inner covers, said outer jacket having fixably secured thereto at least one valve arranged and configured to allow a liquid to pass from the exterior to the interior thereof; and
   c. a low hardened dielectric compound disposed within the volume of space between said outer jacket and each said inner cover, and between each said inner cover and said corresponding spliced conductor;

whereby said splice assembly protects said conductors from the element.

2. The assembly defined in claim 1 wherein said apertures in said inner cover are disposed in a row parallel to said first pair of interlocking tracks and at a distance from said track equal to approximately one-fourth of the circumferential width of said inner cover.

3. The assembly as defined in claim 1 wherein said outer jacket comprises a heat shrinkable material.

4. The assembly as defined in claim 1 wherein each of said inner covers comprises a heat shrinkable material.

5. The assembly defined in claim 1 wherein said outer jacket is made of a transparent material.

6. The assembly as defined in claim 1 wherein the ends of said outer jacket are tapered to permit the assembly to be more readily dragged along the ground.

7. An assembly as defined in claim 1 wherein a sealing means is disposed at the opposite ends of said outer jacket sealing said outer jacket to said cable.

8. The assembly as defined in claim 7 wherein said sealing means is tape.

9. The assembly as defined in claim 1 wherein the plastic of said inner covers and said outer jacket is selected from the group consisting of polyolefin and polyvinyl chloride.

* * * * *